United States Patent
Kishi et al.

[11] Patent Number: 5,379,063
[45] Date of Patent: Jan. 3, 1995

[54] ELECTRONIC STILL CAMERA SYSTEM COMPENSATING FOR IMAGE DISPLACEMENT

[75] Inventors: Kenji Kishi; Tatsuo Nagasaki, both of Yokohama, Japan

[73] Assignee: Olympus Optical Co., Ltd., Tokyo, Japan

[21] Appl. No.: 120,655

[22] Filed: Sep. 13, 1993

Related U.S. Application Data

[63] Continuation of Ser. No. 690,717, Apr. 24, 1991, abandoned.

[51] Int. Cl.$^6$ .............................................. H04N 5/228
[52] U.S. Cl. .................................... 348/208; 348/226; 348/241
[58] Field of Search ............... 358/222, 209, 909, 105, 358/140, 163, 166, 167, 213.27, 213.15, 213.18; H04N 5/228, 5/335, 5/232; 382/45, 47; 348/207, 208, 143, 154, 155, 226, 241

[56] References Cited

U.S. PATENT DOCUMENTS

| | | | |
|---|---|---|---|
| 4,785,351 | 11/1988 | Ishikawa | 358/140 |
| 4,985,764 | 1/1991 | Sato | 358/105 |
| 5,038,213 | 8/1991 | Yoda | 358/209 |
| 5,053,875 | 10/1991 | Ishii et al. | 358/222 |
| 5,053,876 | 10/1991 | Blissett et al. | 358/222 |

*Primary Examiner*—Michael T. Razavi
*Assistant Examiner*—Tuan V. Ho
*Attorney, Agent, or Firm*—Frishauf, Holtz, Goodman & Woodward

[57] ABSTRACT

In an electronic still camera system for forming one still frame image by synthesizing odd and even field images which are field-sequentially output from a CCD, an image compensation circuit is arranged to prevent a deterioration in quality of a still frame image due to an image shift between the two field images. The image compensation circuit includes an interpolation circuit for obtaining two pseudo frame images by performing field interpolation of the odd and even field images, a correlation arithmetic circuit for detecting an amount of image shift between the two field images on the basis of the correlation between the two pseudo frame images, and a shift compensation circuit for compensating the image shift by shifting one of the two field images in accordance with the detected amount of image shift. The correlation arithmetic circuit divides each field image into a plurality of blocks, and detects an amount of image shift in units of blocks. The shift compensation circuit shifts an image in units of blocks.

16 Claims, 4 Drawing Sheets

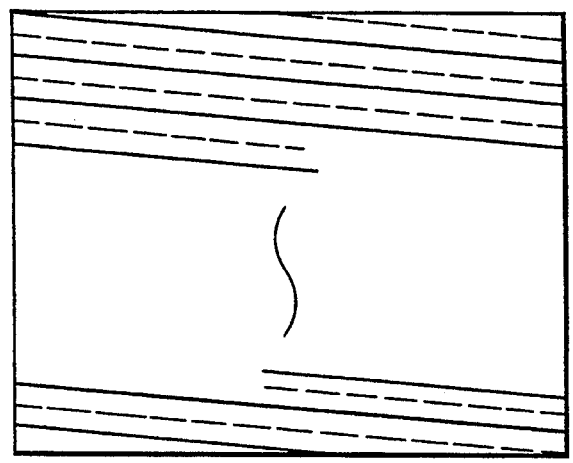
F I G. 3A
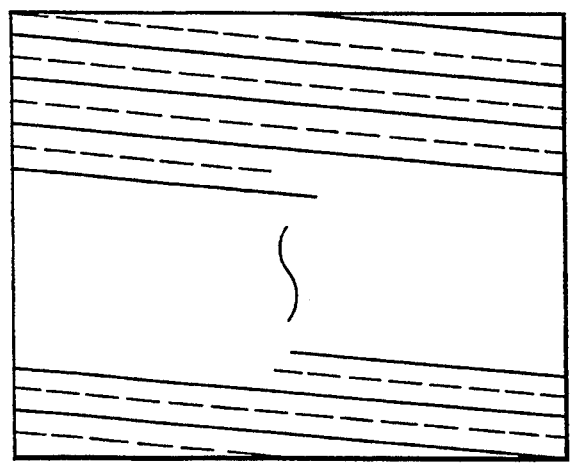
F I G. 3B

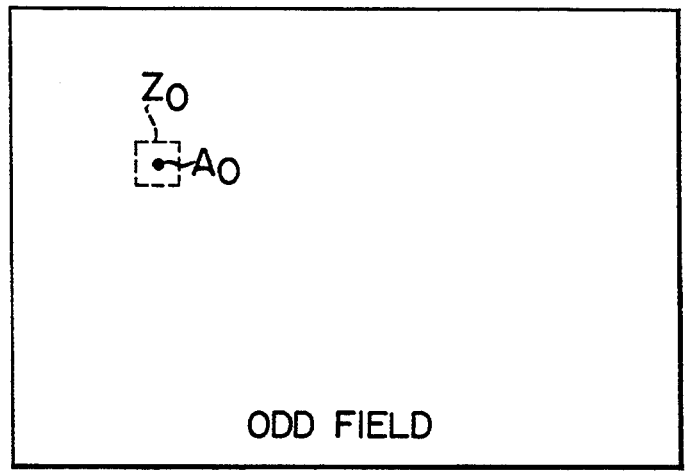
F I G. 4A
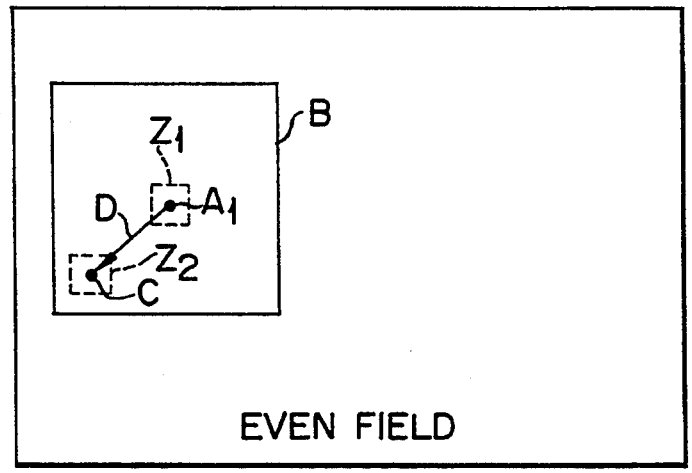
F I G. 4B
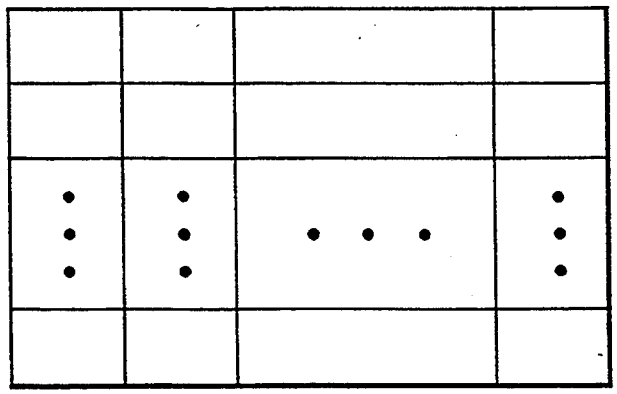
F I G. 5

ELECTRONIC STILL CAMERA SYSTEM COMPENSATING FOR IMAGE DISPLACEMENT

This application is a continuation of application Ser. No. 07/690,717, filed Apr. 24, 1991 now abandoned.

BACKGROUND OF THE INVENTION

1. Field of the Invention

The present invention relates to an electronic still camera system which compensate for an image shift between two field images, which are field-sequentially obtained by electronically imaging an object image, when the two filed images are synthesized into a frame image, thereby obtaining a clear frame image.

2. Description of the Related Art

Recently, in place of a camera using a silver salt film, a great deal of attention has been paid to a solid-state imaging device called an electronic still camera, which records an electronic still image signal obtained by an electronic imaging operation using a solid-state imaging element such as a CCD (charge coupled device), and provides the recorded image for image display by means of a TV monitor or the like. According to an electronic still camera of this type, unlike a photographing operation using a silver salt film, a photographed image (still image) can be easily monitored without performing film development, printing, and the like, and the obtained image can be directly transmitted as image data to be used in the field of news media or the like.

There are two schemes for electronically imaging an object image by using a solid-state imaging element: a scheme for directly obtaining one frame image, provided for image reproduction (display) by means of a TV monitor, from the solid-state imaging element; and a scheme for field-sequentially obtaining two field images (odd and even field images provided for image reproduction by means of a TV monitor) from the solid-state imaging element. In the scheme for field-sequentially obtaining two field images, an electronic still image (frame image) is formed by substantially increasing the number of pixels twice that in the scheme for directly obtaining a frame image from the solid-state imaging element. Therefore, the pixels of the solid-state imaging element can be effectively used to obtain a high-resolution, high-quality electronic still image.

When, however, two field images are field-sequentially obtained from the solid-state imaging element, it is inevitable that the imaging timings of these field images slightly differ from each other. In general, such a difference in timing tends to cause a shift of an object image between two field images (hereinafter referred to an inter-field movement). Especially when a moving object is to be imaged, a shift of an image becomes conspicuous.

Such an image shift between field images poses almost no problem in motion pictures. In electronic still images, however, since these two field images are repeatedly and alternately reproduced and output to perform frame image display, an image shift tends to appear as so-called flicker. Such flicker disturbs a display image and causes a deterioration in quality of a reproduced frame image. In addition, when a still image is to be printed, the inter-field movement causes blurring of an image and hence deteriorates sharpness of the image. Such a problem is similarly posed when still image reproduction is performed in a movie camera. Furthermore, the same problem is posed in a camera using an imaging tube as well as a camera using a solid-state imaging element, such as a CCD, as an imaging portion.

SUMMARY OF THE INVENTION

The present invention has been made in consideration of the above situation, and has as its object to provide an electronic still camera system which can effectively obtain a clear frame image from two field images which are field-sequentially obtained from a solid-state imaging element or an imaging tube.

According to the present invention, there is provided an electronic still camera system comprising:

a solid-state imaging element for photoelectrically converting an object image formed through an optical system, storing a signal charge corresponding to an amount of light corresponding to the object image, and field-sequentially outputting two field images;

an interpolation circuit for performing field-interpolation of each of the two field images, and respectively obtaining pseudo frame images therefrom;

a shift detector for calculating correlation between the two pseudo frame images to obtain an amount of an image shift between the two field images;

a compensating circuit for compensating for the image shift between the two field images in accordance with the amount of the image shift detected by the shift detector; and a synthesizing circuit for synthesizing the two field images, the image shift therebetween is compensated for, into a frame image.

According to the electronic still camera system of the present invention, an amount of an image shift between two field images which are field-sequentially output from the solid-state imaging element is detected based on the correlation between two pseudo frame images which are respectively obtained by performing field-interpolation of the two field images. The image shift between the two field images is compensated for in accordance with the correlation. Thereafter, the two field images, which underwent this shift-compensation, are synthesized into a frame image, thereby preventing a deterioration in sharpness of an object image due to the image shift based on the difference in imaging timings between the two field images. Therefore, a high-quality frame image can be obtained.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 3A and 3B are views for explaining a process for forming a pseudo frame image from only odd and even field images by field-interpolation;

FIGS. 4A and 4B are views respectively showing a comparison reference zone and a comparison reference region, both used for detecting an amount of image shift between the two field images; and FIG. 5 is a view showing an image region dividing method as a modification for detecting the amount of shift of image.

DETAILED DESCRIPTION OF THE PREFERRED EMBODIMENTS

Figure 1:
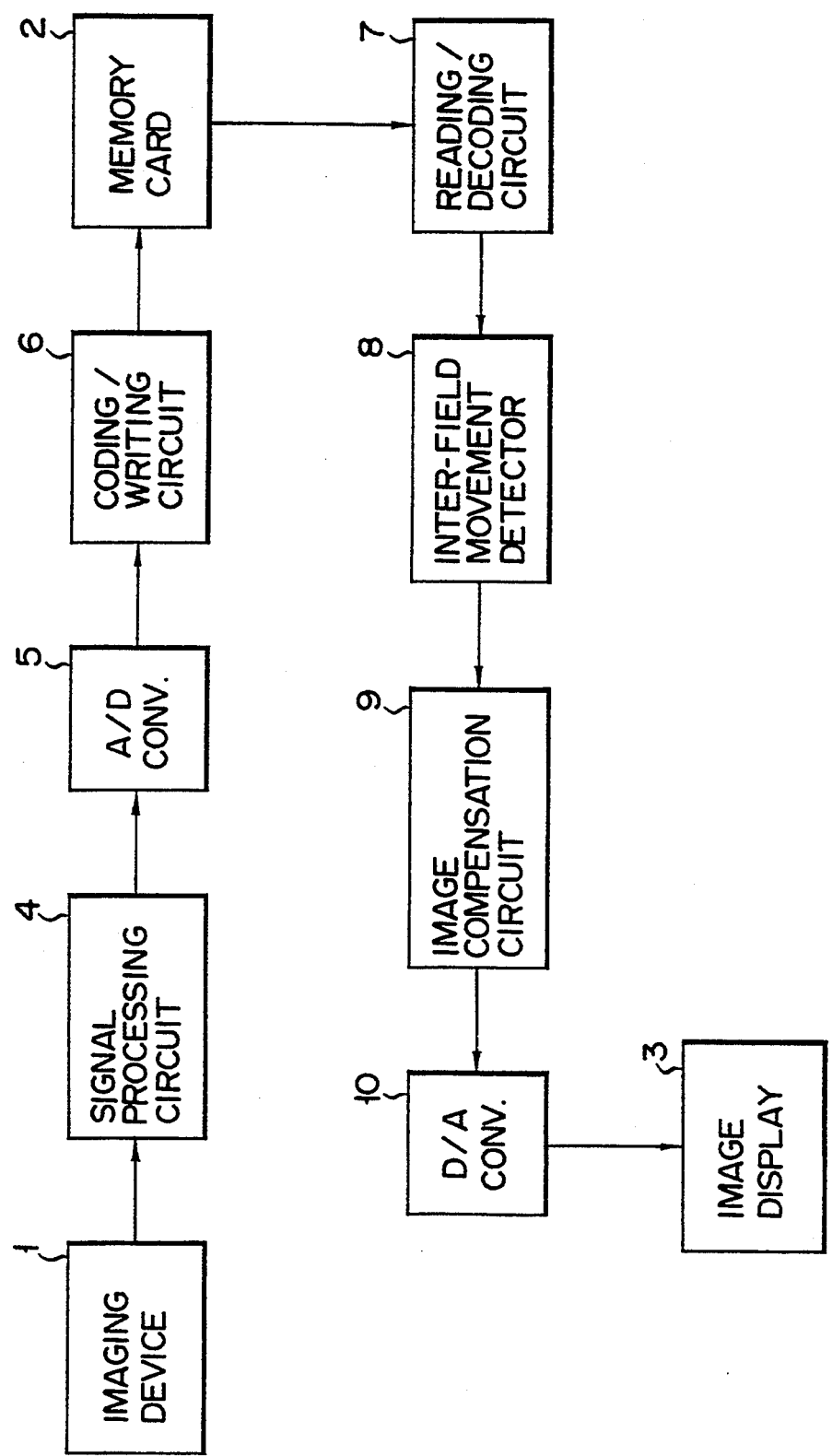
FIG. 1 is a block diagram showing an electronic camera system according to an embodiment of the present invention.
Figure 2:
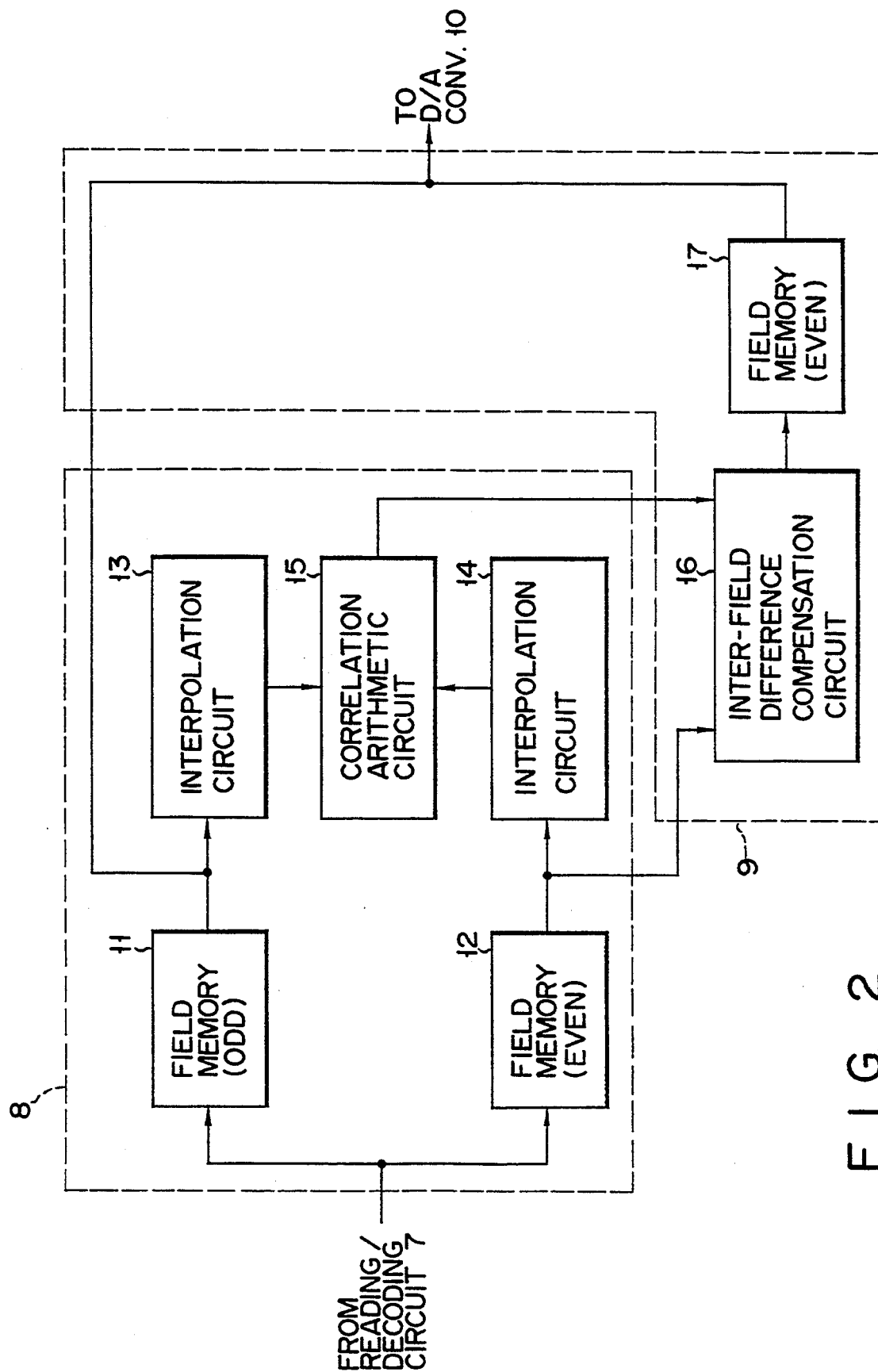
FIG. 2 is a block diagram showing a detailed arrangement of an inter-field movement detector and an image compensation circuit shown in FIG. 1.

A preferred embodiment of an electronic still camera system according to the present invention will now be described with reference to the accompanying drawings. FIG. 1 is a block diagram showing a schematic arrangement of the overall system of this embodiment. FIG. 2 is a block diagram showing a detailed arrangement of an inter-field movement detector and an image compensation circuit shown in FIG. 1.

In the system of this embodiment, for example, as shown in FIG. 1, a solid-state imaging element such as a CCD is used as an imaging device 1. In the system, two field images, which are imaged by the imaging device 1 in a field-sequential manner, are recorded on a predetermined recording medium, e.g., a memory card 2 having a semiconductor memory in a card-like main body, and an electronic still image consisting of the two field images recorded on the memory card 2 is displayed on an image display 3 such as a TV monitor. A signal read out from the memory card 2 may be supplied to a printer to be printed on recording paper as a hard copy. As the imaging device 1, an imaging tube may be used, and a solid-state imaging element, if it is used, is not limited to a CCD but a MOS (metal oxide semiconductor) element may be used. A recording medium is not limited to a memory card, but a floppy disk, a hard disk, a magnetic tape or the like may be used.

More specifically, two field images are field-sequentially read out from the imaging device 1, which are constituted by odd and even field images, provided for image display by means of so-called interlaced scanning, and are processed as a unit of image data (electronic still image). These two field images are subjected to predetermined signal processing such as gamma correction in a signal processing circuit 4. Thereafter, the images are converted into digital image data having a predetermined number of bits by an A/D converter 5. This A/D conversion is basically performed in units of pixels included in a field image. A coding/writing circuit 6 performs block data compression of such two digital field images, and records the resulting data on the memory card 2. Recording of electronic still images on the memory card 2 is performed while each field image is independently managed by, e.g., appending a serial number to each field image.

Generally, the components from the imaging device 1 to the memory card 2 are incorporated in the electronic still camera main body. However, a recording unit such as the memory card 2 may be provided independently from the main body to be connected thereto through signal lines. In this case, a reproducing unit is provided independently from the camera main body. In this arrangement, a memory card as a recording medium is removed from the camera main body or the recording unit, and an image is reproduced by the reproducing unit. However, the reproduction unit may be integrated with the camera main body together with a display portion. If the present invention is applied to a still image reproducing function in a movie camera, the components up to the reproducing unit are incorporated with the camera main body in many cases.

The electronic still images recorded on the memory card 2 are selectively read out in units of two field images under the control of a reading/decoding circuit 7. The read images are decoded by this reading/decoding circuit 7. This decoding operation is performed to reproduce the field image data, which are data-compressed by block coding or the like to be recorded in the memory card 2 as described above, to the original field image data.

An inter-field movement detector 8 and an image compensation circuit 9 (to be described in detail later with reference to FIG. 2) are basically arranged such that an amount of an image shift between two field images is detected by the detector 8, and shift-compensation is performed by the image compensation circuit 9 to compensate for the image shift. The two field images, which underwent shift-compensation in the above-described manner, are output to the image display 3 through a D/A converter 10. For example, the two field images are converted into TV image signals of the NTSC scheme and are provided for image display. That is, in the system of this embodiment, when interlaced scanning is to be performed by using the two field images (odd and even field images) read out from the memory card 2 to display one frame image, the two field images are provided for image display by interlaced scanning after an amount of image shift between the two field images, i.e., an inter-field movement, is detected and compensated for.

Detection of the image shift between the two field images by the inter-field movement detector 8 and shift-compensation by the image compensation circuit 9 will be described in detail below with reference to FIG. 2. An image shift-compensating circuit mainly constituted by the inter-field movement detector 8 and the image compensation circuit 9 includes an odd field memory 11 and an even field memory 12 for respectively storing each of two field images read out from the memory card 2, as shown in FIG. 2. Two field images imaged by the electronic still camera and provided for image display by means of the image display 3 are respectively stored in the odd field memory 11 and the even field memory 12.

Subsequently, interpolation circuits 13 and 14 independently perform field-interpolation processing for the odd and even field images respectively stored in the odd and even field memories 11 and 12, thus forming a pseudo frame image. More specifically, as shown in FIG. 3A, the interpolation circuit 13 obtains a scanning line signal containing even lines, indicated by broken lines, between odd lines indicated by solid lines and contained in an odd field image signal by performing predetermined interpolation arithmetic processing of odd field image signal components, e.g., weighted mean processing of pixel signals at corresponding pixel positions between odd lines, thereby obtaining a pseudo frame image based on the odd field image. Similarly, as shown in FIG. 3B, the interpolation circuit 14 obtains a scanning line signal containing odd lines, indicated by broken lines, between even lines indicated by solid lines and contained in an even field image signal by performing predetermined interpolation arithmetic processing of even field image signal components, thus obtaining a pseudo frame image based on the even field image.

The two pseudo frame images obtained in this manner are supplied to a correlation arithmetic circuit 15 to be provided for the detection of an amount of an image shift (an inter-field movement) between the odd and even field images. The correlation arithmetic circuit 15 sets a comparison reference point $A_0$ and a comparison reference zone $Z_0$ including the point $A_0$ as its center in one of the images as a reference (the odd field image in this case), as shown in FIG. 4A, and sets a comparison reference region B to include a point $A_1$ corresponding to the reference point $A_0$ and a comparison zone $Z_1$ corresponding to the zone $Z_0$ and including the point $A_1$ as its center, in the other image (the even field image in this case), as shown in FIG. 4B. Each zone having the same area that of the zone $Z_0$ in the comparison reference region B is scanned to check the correlation between each zone in the region B and the comparison reference zone $Z_0$. A scanning zone at which the highest correlation value is established is set to be a comparison zone $Z_2$ for the measurement of an amount of image shift. The amount of an image shift (a vector D indicated by an arrow in FIG. 4B) is measured by obtaining a distance between a center point C of the zone $Z_2$ and the center point $A_1$ of the zone $Z_1$.

Alternatively, as shown in FIG. 5, an image frame may be divided into blocks having a predetermined size so that an amount of image shift is detected in units of blocks.

The above-mentioned correlation arithmetic processing is performed as follows, provided that the odd field image is set as a reference, as shown in FIG. 4A. If pixel data at the comparison reference point $A_0$ in the odd field image is represented by f(x), and pixel data at a point separated from the comparison reference point $A_1$, in the reference region B in the even field image, by a distant t is represented by g(x+t), the following correlation arithmetic expression is used to find a point at which $\phi(t)$ becomes minimum:

$$\phi(t) = \int (f(x) - g(x+t))^2 dx$$

Alternatively, a variance method may be employed to detect a point at which V(s) becomes minimum, in the following arithmetic expression, as a corresponding point at which the highest correlation is established:

$$V(s) = <(f(x)-g(x+t))^2> - <(f(x)-g(x+t))>^2$$

where < > is an operand representing a mean value as follows:

$$<X> = \frac{1}{N} \sum_{i=1}^{N} X_i.$$

The amount of image shift, detected in this manner, between the pseudo frame images is regarded as the amount of image shift between the above-mentioned field images. Subsequently, shift-compensation is performed by an inter-field difference compensation circuit 16. In this embodiment, the amount of the shift of the even field image is detected with reference to the odd field image. For this reason, the even field image stored in the even field image memory 12 is read out and supplied to the inter-field difference compensation circuit 16 so that the even field image is written at a position in a field image memory 17, at which the image shift is compensated for, under the control of the inter-field difference compensation circuit 16, thereby performing compensation of the inter-field difference.

In this shift-compensation, which is performed by shifting the write position of the even field image, shift-compensation may be performed with regards to the overall image in accordance with an amount of image shift detected at one reference zone. As described above, however, if an amount of image shift is detected at each of a plurality of comparison reference zones, or in units of blocks, as shown in FIG. 5, compensation may be performed in units of reference zones or blocks. Alternatively, shift-compensation may be performed for only an image portion having a large amount of image shift. If one field image is shifted as a whole, an image shift may occur at a portion where no image shift existed in an original image. The above-mentioned operation is performed to prevent such inconvenience.

In this manner, image display is performed by the interlaced scanning scheme using the even field image stored in the field image memory 17 upon shift compensation (reconstruction), and the odd field image stored in the odd field image memory 11, thereby obtaining a frame image free from flicker caused by an inter-field movement.

According to the system of this embodiment, which includes the above-described circuit for compensating for the image shift between two field images, flicker in still frame image can be effectively suppressed, which is caused by an image shift due to the difference in imaging timing between two field images which are field-sequentially obtained. Shift-compensation may be performed for only a given image portion at which an image shift occurs so as to prevent new flicker from occurring at other image portions upon prevention of the flicker of the given image portion. That is, flicker can be prevented without adversely affecting the overall image by performing shift-compensation for only a moving portion of an object image.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. In this embodiment, shift-compensation is performed with regards to field images recorded on the memory card. However, a camera system may be designed such that shift-compensation is directly performed with regards to field images themselves which are field-sequentially obtained from a solid-state imaging device, and the resulting images are recorded on a memory card or displayed on an image monitor. In addition, an algorithm for detecting an amount of image shift by correlation arithmetic processing, and a technique for compensating for the image shift on the basis of the detected amount of image shift may be determined in accordance with a system specification.

As has been described above, according to the present invention, the amount of image shift between field images is detected from the correlation between pseudo frame images formed by field-interpolation, and the image shift between the field images is then compensated for. With this operation, various practical effects can be obtained. For example, even if an electronic still image is repeatedly displayed by using field images, a high-quality image having no flicker can be displayed.

What is claimed is:

1. An electronic still camera system comprising:
   an imaging element for converting an amount of light corresponding to an object image formed through an optical system to a signal corresponding to said amount of light;
   imaging means for field-sequentially obtaining two field images from said signal outputted by said imaging element, one of the two field images being an odd field image constituted by odd scanning lines, and the other of the two field images being an even field image constituted by even scanning lines;
   a first memory unit coupled to said imaging means and in which said odd and even field images are stored;
   means for interpolating said data of each of said odd and even field images obtained by said imaging means to respectively obtain first and second pseudo frame images;
   means for determining a correlation between said first and second pseudo frame images to detect an amount of image shift between the odd and even field images;
   means for shifting one of the odd and even field images with respect to the other of the odd and even field images in accordance with the detected amount of image shift;
   means for storing said shifted field image in a second memory unit while said other field image is retained in said first memory unit; and
   means for combining the data of said stored shifted field image with the stored data of said other field image into a frame image for display as a still image.

2. A system according to claim 1, wherein said correlation determining means includes means for calculating correlation in units of block images which is obtained by dividing each field image into blocks each having a predetermined size, and said shifting means includes means for compensating for the image shift in units of blocks.

3. An apparatus according to claim 1, wherein said determining means comprises:
   means for calculating correlation between a reference zone including a reference point in one of the first and second pseudo frame images and each zone including a point, in the other pseudo frame image, corresponding to the reference point;
   first means for detecting a second zone in which highest correlation is established; and
   second means for detecting a distance between the reference zone and the second zone as an amount of image shift; and
   said shifting means comprises means for shifting a position of one of the odd and even field images associated with the other pseudo frame image.

4. An apparatus according to claim 3, wherein said first detecting means comprises means for detecting, as the second zone, a zone in which a correlation value $\phi(t)$ represented by the following equation becomes minimum:

$$\phi(t) = \int (f(x) - g(x+t))^2 dx$$

where f(x) is pixel data at the reference point, and g(x+t) is pixel data at a point separated from a point, in the other of said first and second pseudo frame images, corresponding to the reference point, by a distance t.

5. An apparatus according to claim 3, wherein said first detecting means comprises means for detecting, as the second zone, a zone in which a variance V(s) represented by the following equation, becomes minimum:

$$V(s) = <(f(x)-g(x+t))^2> - <(f(x)-g(x+t))>^2$$

where f(x) is pixel data at the reference point, and g(x+t) is pixel data at a point separated from a point, in the other of said first and second pseudo frame images, corresponding to the reference point, by a distance t, and < > is an operand representing a mean value as follows:

$$<X> = \frac{1}{N} \sum_{i=1}^{N} X_i.$$

6. An apparatus according to claim 1, wherein said determining means comprises:
   means for calculating correlation between reference zones each including a reference point in one of the first and second pseudo frame images and each zone including a point, in given reference regions in the other pseudo frame image, corresponding to the reference point;
   means for detecting a second zone in which highest correlation is established in units of the reference regions;
   means for detecting a distance between the reference zone and the second zone as an amount of image shift in units of the reference regions; and
   wherein said shifting means comprises means for shifting a position of one of the odd and even field images associated with the other pseudo frame image in units of the reference regions.

7. An apparatus according to claim 1, wherein said determining means comprises:
   means for calculating correlation between reference zones each including a reference point in one of the first and second pseudo frame images and each zone including a point, in the other pseudo frame image, corresponding to the reference point, in units of block regions which is obtained by dividing a frame image into blocks each having a predetermined size;
   means for detecting a second zone in which highest correlation is established in units of block regions;
   means for detecting a distance between the reference zone and the second zone as an amount of image shift in units of the block regions; and
   wherein said shifting means comprises means for shifting a position of one of the odd and even field images associated with the other pseudo frame image in units of the block regions.

8. An electronic still camera apparatus comprising:
   imaging means for imaging an object, and for sequentially outputting odd and even field images respectively constituted by odd line and even line scanning lines;
   field memory means, connected to said imaging means, for storing the odd and even field images;
   means for forming first and second pseudo frame images from the odd and even field images by interpolating the even and odd scanning lines by using the odd and even scanning lines of the odd and even field images output from said field memory means, respectively;

detecting means for calculating a correlation between the first and second pseudo frame images in order to detect an image shift of one of said odd and even field images with respect to the other of said odd and even field images;

means for compensating for an image shift of one of the odd and even field images with respect to the other of the odd and even field images in accordance with the image shift detected by said detecting means, and for storing said compensated field image in a memory while the other field image is retained in the field memory means; and means for forming a frame image on the basis of said one of the odd and even field images, the image shift of which is compensated for by said compensating means, and the other of the odd and even field images output from said imaging means by combining said compensated field image and one of the odd and even field images to form a still image.

9. An apparatus according to claim 8, further comprising frame memory means for storing the frame image output from said imaging means.

10. An apparatus according to claim 8, wherein said field memory means is one of a memory card and a floppy disk which can be detached from a main body of the apparatus.

11. An apparatus according to claim 8, wherein said detecting means comprises:

means for calculating a correlation between a reference zone including a reference point in one of the first and second pseudo frame images and each zone including a point, in the other pseudo frame image, corresponding to the reference point;

means for detecting a second zone in which highest correlation is established; and means for detecting a distance between the reference zone and the second zone as an amount of image shift; and said shifting means comprises means for shifting a position of one of the odd and even field images associated with the other pseudo frame image.

12. An apparatus according to claim 8, wherein said detecting means comprises means for detecting, as the second zone, a zone in which a correlation value $\phi(t)$ represented by the following equation becomes minimum:

$$\phi(t) = \int (f(x) - g(x+t))^2 dx$$

where f(x) is pixel data at the reference point, and g(x+t) is pixel data at a point separated from a point, in the other of said first and second pseudo frame images, corresponding to the reference point, by a distance t.

13. An apparatus according to claim 8, wherein said detecting means comprises means for detecting, as the second zone, a zone in which a variance V(s) represented by the following equation, becomes minimum:

$$V(s) = <(f(x) - g(x+t))^2> - <(f(x) - g(x+t))>^2$$

where f(x) is pixel data at the reference point, and g(x+t) is pixel data at a point separated from a point, in the other of said first and second pseudo frame images, corresponding to the reference point, by a distance t, and $<>$ is an operand representing a mean value as follows:

$$<X> = \frac{1}{N} \sum_{i=1}^{N} X_i.$$

14. An apparatus according to claim 8, wherein said detecting means comprises:

means for calculating a correlation between reference zones each including a reference point in one of the first and second pseudo frame images and each zone including a point, in given reference regions in the other pseudo frame image, corresponding to the reference point;

means for detecting a second zone in which highest correlation is established in units of the reference regions; and means for detecting a distance between the reference zone and the second zone as an amount of image shift in units of the reference regions; and said shifting means comprises means for shifting a position of one of the odd and even field images associated with the other pseudo frame image in units of the reference regions.

15. An apparatus according to claim 8, wherein said detecting means comprises:

means for calculating a correlation between reference zones each including a reference point in one of the first and second pseudo frame images and each zone including a point, in the other pseudo frame image, corresponding to the reference point, in units of block regions which is obtained by dividing a frame image into blocks each having a predetermined size;

means for detecting a second zone in which highest correlation is established in units of block regions; and means for detecting a distance between the reference zone and the second zone as an amount of image shift in units of the block regions; and said shifting means comprises means for shifting a position of one of the odd and even field images associated with the other pseudo frame image in units of the block regions.

16. An apparatus according to claim 8, wherein said imaging means comprises a solid-state imaging device.

* * * * *